(12) United States Patent
Ferrari et al.

(10) Patent No.: US 6,902,362 B2
(45) Date of Patent: Jun. 7, 2005

(54) MACHINE TOOL

(75) Inventors: Maurizio Ferrari, Pizzighettone (IT); Adriano Granata, Pizzighettone (IT); Bruno Schiavi, Piacenza (IT)

(73) Assignee: JOBS S.p.A., Piacenza (IT)

( * ) Notice: Subject to any disclaimer, the term of this patent is extended or adjusted under 35 U.S.C. 154(b) by 0 days.

(21) Appl. No.: 10/462,647

(22) Filed: Jun. 17, 2003

(65) Prior Publication Data

US 2003/0235476 A1 Dec. 25, 2003

(30) Foreign Application Priority Data

Jun. 21, 2002 (IT) .................................... BO2002A0400

(51) Int. Cl.⁷ .............................. B23D 7/00; B23C 7/00
(52) U.S. Cl. ........................ 409/237; 409/235; 408/234
(58) Field of Search ................. 409/237, 235, 409/202, 212, 236, 238, 239; 408/235, 234

(56) References Cited

U.S. PATENT DOCUMENTS

| | | | | |
|---|---|---|---|---|
| 4,642,861 A | * | 2/1987 | Riley et al. ................ 29/38 A |
| 4,761,876 A | * | 8/1988 | Kosmowski .................. 483/1 |
| 4,869,626 A | * | 9/1989 | Kosmowski ................ 408/235 |
| 5,425,237 A | * | 6/1995 | Suer ............................. 60/414 |
| 5,584,621 A | * | 12/1996 | Bertsche et al. ............ 409/201 |
| 5,688,084 A | * | 11/1997 | Fritz et al. .................. 409/202 |
| 6,145,178 A | * | 11/2000 | Green ......................... 409/203 |
| 6,182,448 B1 | * | 2/2001 | Ohkura et al. ................ 60/445 |
| 6,439,813 B1 | * | 8/2002 | Repossini ................... 409/235 |
| 6,538,227 B1 | * | 3/2003 | Sano et al. ................. 219/69.2 |
| 6,634,839 B2 | * | 10/2003 | Ferrari et al. .............. 409/235 |
| 6,641,341 B2 | * | 11/2003 | Sato et al. .................. 409/137 |
| 6,786,129 B2 | * | 9/2004 | Ando .......................... 91/318 |
| 2002/0047319 A1 | * | 4/2002 | Ferrari et al. ................ 310/12 |

FOREIGN PATENT DOCUMENTS

EP 122016 8/2001
JP 09257038 A * 9/1997 ........... F16C/32/06

OTHER PUBLICATIONS

Patent Abstracts of Japan, vol. 012, No. 475, Dec. 14, 1988 & JP 63 200904 A (Mitsubishi Electric Copr.), Aug. 19, 1988.
European Search Report Sep. 25, 2003.

* cited by examiner

Primary Examiner—Derris H. Banks
Assistant Examiner—Dana Ross
(74) Attorney, Agent, or Firm—Harbin King & Klima

(57) ABSTRACT

In an automatic machine tool (1) comprising a spindle mounting slide (4) which is driven by a linear electric motor (9) in a vertical direction (V) in a slideway (8), the slide (4) is equipped with a counterweight device (13) comprising a cylinder (19) within which there slides a piston 17. The cylinder (19) and the piston (17) form a first balancing chamber (31) and a second counterbalancing chamber (32), the second counterbalancing chamber (32) being connected to a circuit (33) for feeding a fluid (34) under pressure.

8 Claims, 2 Drawing Sheets

MACHINE TOOL

BACKGROUND OF THE INVENTION

The present invention relates to a device for driving a spindle mounting slide in a machine tool.

The invention relates in particular to a counterweight device for the drive of a slide that carries a spindle mounting head in a machine tool supported by a frame and controlled by linear motors that drive the tool along one or more axes.

Some automatic machine tools known in prior art comprise a linear electric motor which provides at least the vertical drive for the mounting slide. The linear electric motor comprises a rotor, also known as primary member or simply "primary" and a stator, also known as secondary member or simply "secondary", the primary being integral with the mounting slide, and the secondary being integral with the vertical slideway of the slide.

The spindle mounting slide is usually connected to a counterweight device designed to balance the mounting head and slide unit during its vertical movement.

Experiments have shown that, in prior art machines of the type described above, the counterweight device does not effectively balance the mounting head and slide unit if the total weight of the unit is changed, for example when the head is removed for tool substitution or during maintenance.

This problem is felt all the more strongly with linear electric motors which cannot generate very strong drive power, especially for movements along the vertical axis.

Thus, when the tool mounting head is substituted, the linear motor is unable, for example, to compensate for the sudden decrease in weight due to the removal of the head because the latter may weigh even more than the power that the motor itself can generate.

The aim of the present invention is to overcome the above mentioned disadvantage by providing a device for driving a spindle mounting slide equipped with a counterweight device capable of effectively balancing the mounting head and slide unit even when the weight of the latter changes.

SUMMARY OF THE INVENTION

The present invention accordingly provides a machine tool with at least one working unit comprising a mounting slide and a spindle mounting head, said unit extending principally longitudinally along a defined axis and driven, in a direction parallel to said axis relative to a slideway mounted in a fixed position relative to said direction, by at least one linear electric motor, the working unit being connected to counterweight means, wherein the counterweight means comprise means for compensating the weight of the unit.

BRIEF DESCRIPTION OF THE DRAWINGS

The technical characteristics of the invention, with reference to the above aims, are clearly described in the claims below and its advantages are apparent from the detailed description which follows, with reference to the accompanying drawings which illustrate a preferred embodiment of the invention provided merely by way of example without restricting the scope of the inventive concept, and in which:

DESCRIPTION OF THE PREFERRED EMBODIMENTS

Figure 1:
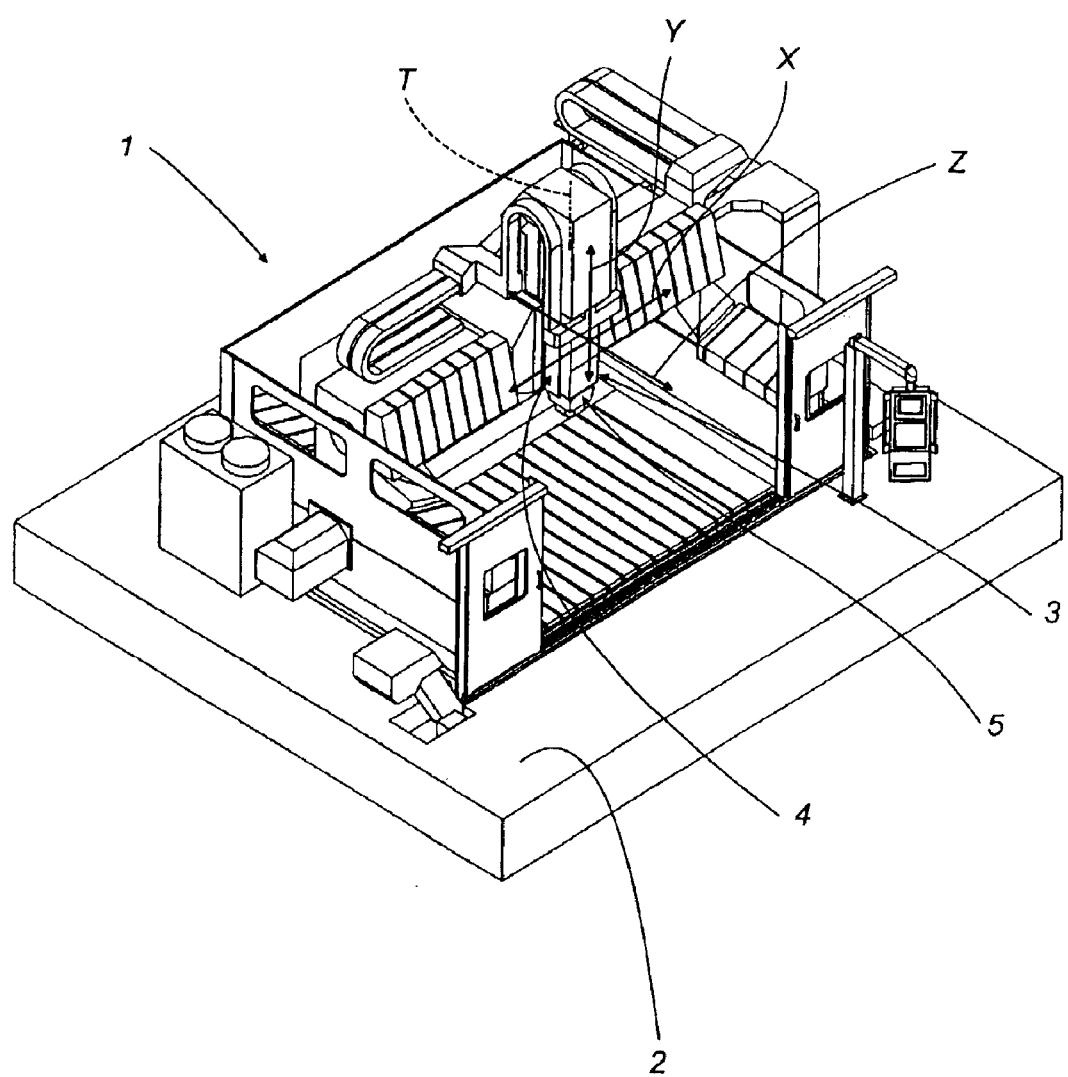
FIG. 1 is a schematic perspective view of a machine tool made in accordance with the present invention.

With reference to FIG. 1, the numeral 1 denotes in its entirety an automatic machine tool of the numeric control type mounted on a base 2. The machine 1 is equipped with an operating module 3 that can move in three-dimensional space along the three linear axes X, Y and Z of a Cartesian system.

Figure 2:
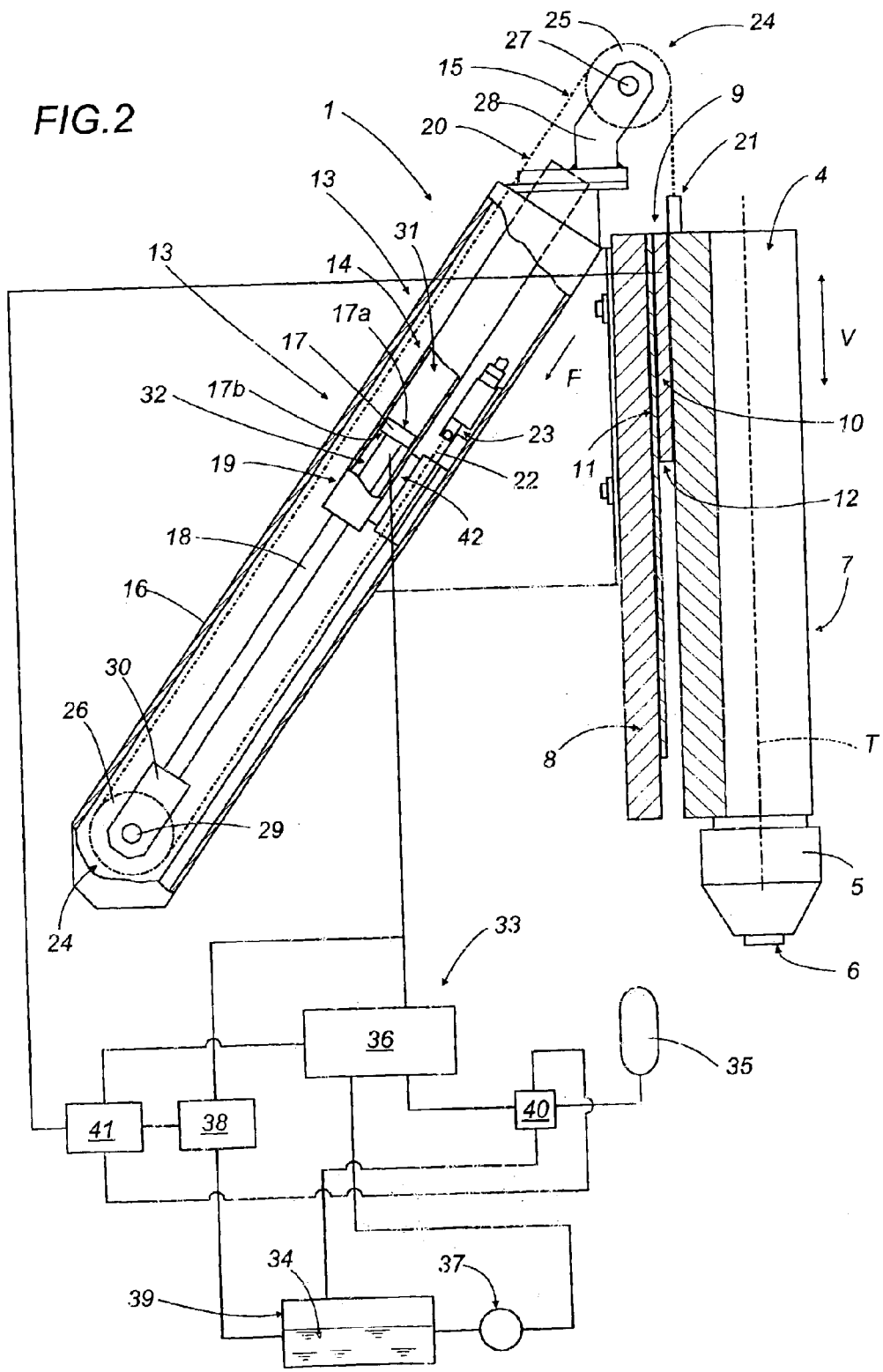
FIG. 2 is a schematic side detail view of a part of the machine tool shown in FIG. 1, and illustrates the part in a raised operating position.

As illustrated in FIG. 2, the operating module 3 comprises a mounting slide 4 that carries a spindle head 5 which mounts a spindle 6 that transmits rotational cutting motion to a customary cutting tool that is not illustrated.

The lower end 4a of the slide 4 mounts the head 5 which in turn mounts the spindle 6 to which the aforementioned tools (not illustrated) are fitted.

The slide 4 and the spindle mounting head 5 together constitute a working unit 7 that extends mainly along a longitudinal axis T and can move in a vertical direction V parallel to the Y axis.

The slide 4 is supported and guided in its vertical movement by a slideway 8 that is mounted in a fixed position relative to the vertical direction V and also extending longitudinally along the direction V itself.

The slide 4 is driven by a linear electric motor 9 comprising a primary member or rotor 10 and a secondary member or stator 11.

Again with reference to FIG. 2, the primary member or rotor 10 is mounted on and connected to the slide 4 at an upper end 4b of it, opposite the aforementioned lower end 4a.

The secondary member or stator 11 extends longitudinally along the full length of the slideway 8 and is integral with the slideway.

The primary member 10 and the secondary member 11 are positioned opposite each other and separated by a suitable air gap 12 according to the known operating principle of linear electric motors.

The slide 4 is supported and guided in its vertical movement in direction V by appropriate sliding guide means which form a sliding fit between the slide 4 and the slideway 8, said sliding guide means being of customary type and therefore not illustrated.

As shown in FIG. 2, the slide 4 is equipped with a counterweight device 13 designed to counterbalance the slide 4 during its rapid movement in the slideway 8 in direction V. The counterweight device 13 substantially comprises an elastic element 14 and a flexible transmission element 15 which connects the slide 4 to the elastic element 14 itself.

The elastic element 14 is housed in a tubular casing 16 which is integral with the slideway 8 that supports the slide 4 and comprises a piston 17 fixed to a stem 18. During the compression step, which is not illustrated in the drawing, consequent upon the lowering of the slide 4, the piston 17 penetrates a corresponding cylinder 19 to define a first lowered end position of the slide 4 where the elastic element 14 is loaded.

The upper face 17a of the piston 17 and the cylinder 19 form a first balancing chamber 31 whose volume varies as the position of the stem 18 and piston 17 inside the cylinder 19 changes.

The structure and operation of the elastic element 14 are of well known type and therefore not described in more detail.

With its lower, second face 17b, opposite the upper, first face 17a, the piston 17 forms a second balancing chamber 32 inside the cylinder 19. The second counterbalancing chamber 32 is located inside the cylinder 19 on the side of the piston 17 opposite the first balancing chamber 31.

Advantageously, the flexible transmission element 15 consists of a roller chain 20, a first end of which 21 is fixed to the top 4b of the slide 4, and a second end of which 22 is fixed to an adjustable anchor element 23 that is integral with the tubular casing 16.

Transmission means 24 of the chain 20, comprising two customary pulleys, namely, a first pulley 25 at the top and a second pulley 26 at the bottom, form defined paths for the movements of the chain 20 itself between the two working positions adopted by the slide 4 during its movement in the direction V.

The top pulley 25 rotates freely on a pin 27 supported by a bracket 28 connected to the tubular casing 16 integral with the slideway 8, whilst the bottom pulley 26 rotates freely on a pin 29 supported by a respective bracket 30 linked to the piston 17 of the elastic element 14.

The counterbalancing chamber 32 is connected with a circuit 33 for feeding a fluid 34 under pressure, advantageously oil, into the chamber 32.

The circuit 33 comprises an accumulator 35 for the fluid 34, a servo valve 36, a pump 37, a proportional valve 38, a tank 39 for discharging and collecting the fluid 34 and a by-pass valve 40 for discharging the fluid from the accumulator 35 directly into the tank 39.

The machine 1 also comprises a computerized control unit 41 for driving the circuit 33, the unit 41 being operatively connected to the servo valve 36, to the proportional valve 38, to the by-pass valve 40 and to the slide 4.

During operation of the machine 1, the working unit 7 comprising the slide 4 and the spindle mounting head 5 moves rapidly in direction V towards and away from the workpiece, which is not illustrated, facing the spindle 6.

Starting from the position shown in FIG. 2, when the working unit 7 moves down to a position below the vertically fixed slideway 8, the chain 20 is tensioned and, as a result of the transmission effected by the pulleys 25, 26, compresses the elastic element 14, thus forcing the piston 18 to penetrate the cylinder 19.

Instead, as shown in FIG. 2, when the slide 4 reaches its raised end position relative to the slideway 8, the action of releasing the elastic potential energy accumulated by the elastic element 14, keeps the chain 20 tensioned thanks to the pulleys 25, 26.

During the normal operating cycle of the machine 1, the spindle mounting head 5, mounted on the slide 4, is driven along the Z axis by the linear motor 9 and the elastic potential energy accumulated by the elastic element 14 balances the potential energy created by the weight of the working unit 7 formed by the slide 4 and by the head 5 itself.

Thus, when the working unit 7 has to move along the Z axis, the linear electric motor does not have to overcome the true total weight of the slide 4 and head 5, because the elastic element 14, by balancing the weight force in play, considerably reduces the actual weight to be moved.

In other words, the elastic element 14 balances the weight of the working unit 7, that is to say, of the slide 4 and head 5.

When the spindle mounting head 5 is substituted, for example when production requires a changeover to another process, the system constituted by the working unit 7 is unbalanced because the head 5, which accounts for a considerable part of the total weight, is not fitted during changeover operations.

In this regard, it is important to note that the linear electric motor 9, by its very nature, cannot generate very strong drive power, especially for vertical movements along the Z axis.

Thus when the tool head is substituted, the linear electric motor 9 is unable to compensate for the sudden decrease in the weight of the working unit 7 and the elastic force created by the elastic element 14 is not adequately opposed.

When the head 5 is removed from the slide 4, the circuit 33 forces fluid 34 into the second counterbalancing chamber 32 at a certain pressure. The fluid 34 under pressure acts on the lower face 17b of the piston 17, thereby applying on the stem 18 a defined force F that is substantially equal to the weight force previously applied by the spindle mounting head 5.

Without the compensating action of the fluid 34 under pressure, the piston 17 would move back in the direction of the arrow F, causing the slide 4 to move up suddenly in direction V and thus creating a hazardous situation.

The proportional valve 38 is driven by the computerized control unit 41 of the circuit 33 to keep the pressure in the second counterbalancing chamber 32 at a predetermined value, depending on the current position of the slide 4 along the direction V.

In other words, the servo valve 36 and the proportional valve 38 are driven by the computerized unit 41 to feed or discharge the fluid 34 into and out of the second counterbalancing chamber 32, thereby increasing or reducing the pressure in the chamber.

Thus, during the normal operating cycle of the machine tool 1, the first balancing chamber 31 forming the elastic element 14 applies a defined pressure on the upper face 17a of the piston 17 whilst the accumulator keeps the pressure in the second counterbalancing chamber 32 at a low value so that no force is applied to the stem 18 through the lower face 17b of the piston 17.

Instead, when the head 5 is removed from the working unit 7 for substitution, the piston 17, no longer balanced by the weight of the unit 7 itself, would tend to expand inside the cylinder 19, in the direction of the arrow F. To prevent this expansion, fluid 34 is drawn from the tank 39 and pumped into the second chamber through the servo valve 36 by the pump 37.

The pressure in the second chamber 32 is then brought to the predetermined desired value by driving the proportional valve 38.

The proportional valve 38 opens the outlet through which the 34 is discharged from the chamber 32 to the tank 39, this operation being electronically controlled by the unit 41.

Advantageously, in a circuit such as the one illustrated in FIG. 2, the servo valve 36 consists of a customary four-way, three-position distributor electrically controlled by solenoids.

The circuit 33 for feeding and controlling the fluid 34, and the second counterbalancing chamber 32 together constitute means 42 for compensating the weight of the working unit 7.

What is claimed is:

1. A machine tool with at least one working unit comprising a mounting slide and a spindle mounting head, said unit extending principally longitudinally along an axis and driven, in a direction (V) parallel to said axis and to a fixed slideway by at least one linear electric motor, the working unit being connected to counterweight means, the counterweight means comprising means for compensating for the weight of the unit, wherein the counterweight means comprises an elastic element for returning the unit at least in the direction (V), the elastic return element acting in conjunction with the compensating means, the elastic return element comprising a piston and a cylinder inside which there is defined a first balancing chamber, the compensating means comprising a second balancing chamber acting as a counterbalancing chamber to the first balancing chamber, the compensating means comprising a circuit for feeding and controlling a fluid under pressure into the second balancing chamber and the circuit also comprising a proportional valve for regulating the pressure of the fluid inside the second balancing chamber.

2. The machine tool according to claim 1, wherein the second balancing chamber is located inside the cylinder on the side of the piston opposite the first balancing chamber.

3. The machine tool according to claim 2, further comprising a computerized control unit for driving the circuit.

4. The machine tool according to claim 2, further comprising a computerized control unit for driving the circuit, the computerized control unit controlling the proportional valve to keep the pressure in the second balancing chamber at a predetermined value depending on a position of the mounting slide along the direction (V).

5. The machine tool according to claim 2, further comprising a computerized control unit for driving the circuit, the computerized control unit controlling the proportional valve and the circuit to force fluid into the second balancing chamber at a pressure value to counterbalance a removed weight from the spindle head depending on a position of the mounting slide along the direction (V).

6. The machine tool according to claim 1, further comprising a computerized control unit for driving the circuit.

7. The machine tool according to claim 1, further comprising a computerized control unit for driving the circuit, the computerized control unit controlling the proportional valve to keep the pressure in the second balancing chamber at a predetermined value depending on a position of the mounting slide along the direction (V).

8. The machine tool according to claim 1, further comprising a computerized control unit for driving the circuit, the computerized control unit controlling the proportional valve and the circuit to force fluid into the second balancing chamber at a pressure value to counterbalance a removed weight from the spindle head depending on a position of the mounting slide along the direction (V).

* * * * *